Oct. 29, 1968 M. A. KOCHEVAR ET AL 3,408,033
MIRROR MOUNTING
Filed Oct. 10, 1966 2 Sheets-Sheet 1
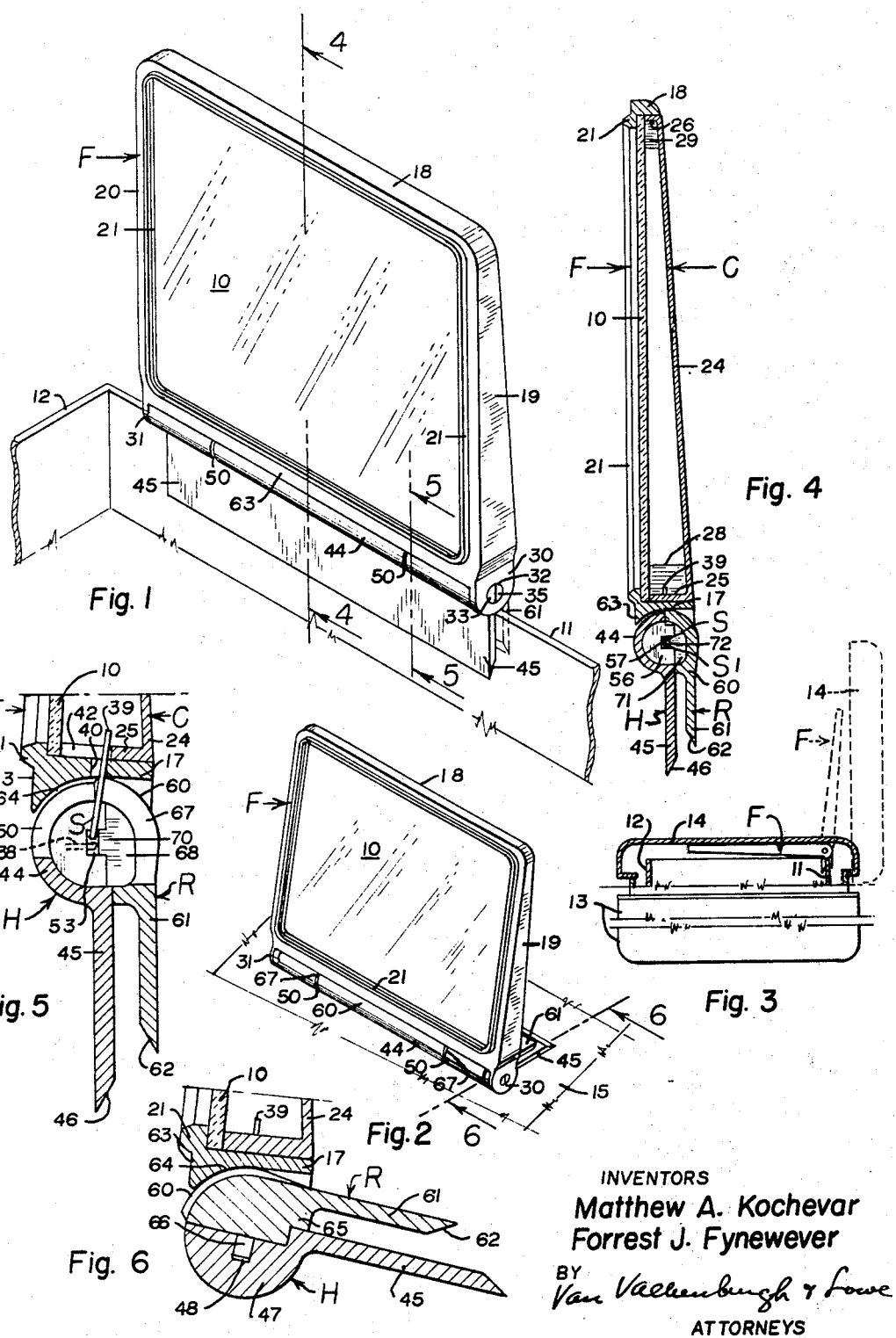
INVENTORS
Matthew A. Kochevar
Forrest J. Fynewever
BY Van Valkenburgh & Lowe
ATTORNEYS

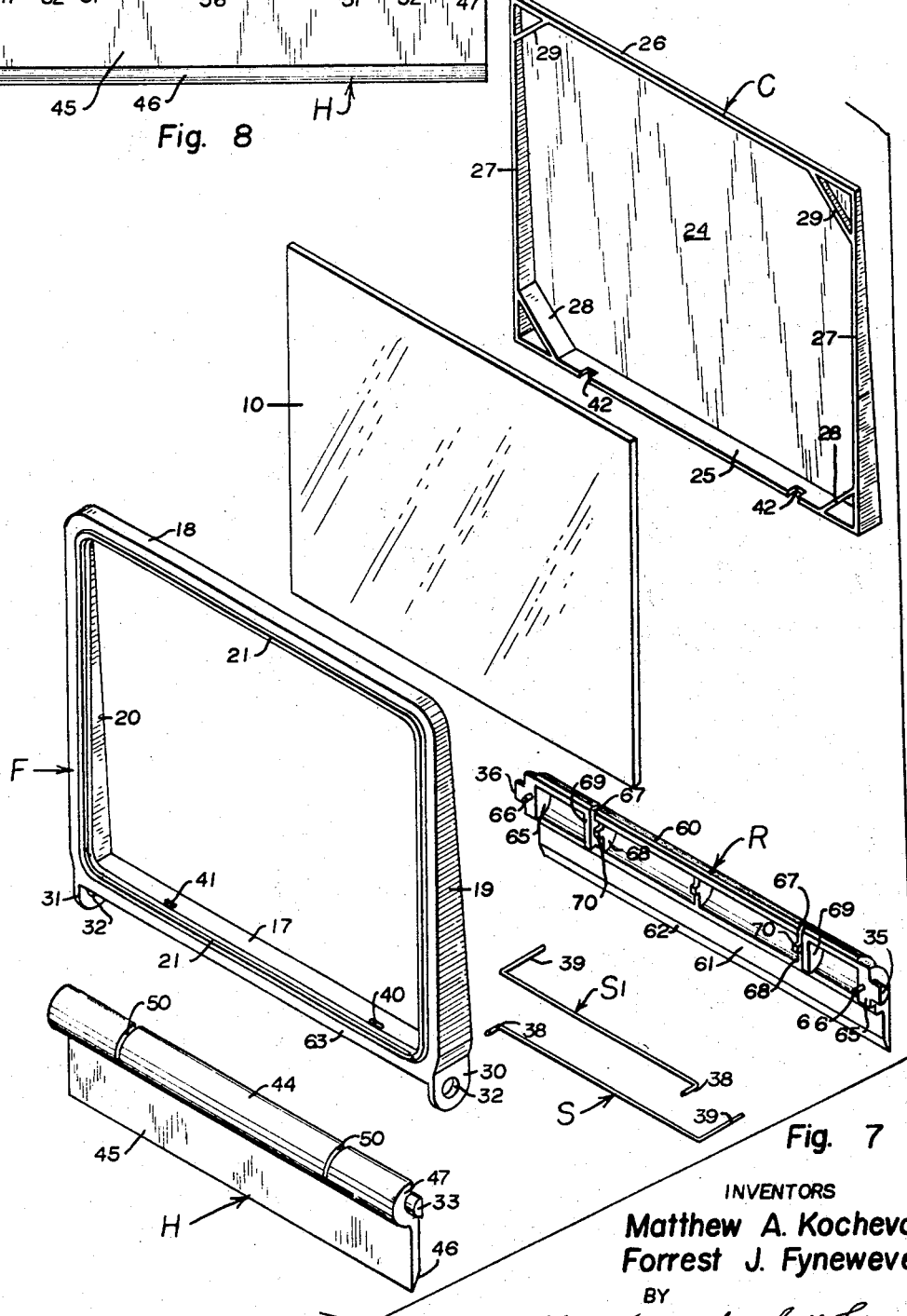

3,408,033
MIRROR MOUNTING
Matthew A. Kochevar, Golden, and Forrest J. Fynewever, Denver, Colo., assignors to Samsonite Corporation, Denver, Colo., a corporation of Colorado
Filed Oct. 10, 1966, Ser. No. 585,697
9 Claims. (Cl. 248—474)

ABSTRACT OF THE DISCLOSURE

A mirror mounting for use in luggage cases and the like, with the mirror mounted in a frame pivoted on a hollow base formed by opposed, longitudinal parts having segments hollow on the inside, with the segments being of different diameter, to provide frictional resistance to movement of the frame in certain desired positions. A spring inside the hollow base has ends which extend through slots to the frame and the two halves of the base are provided with depending flanges which provide a bifurcation, so that the base may be placed on a rib of a tray in the top of the luggage case, so that, when the lid is closed, the mirror will be pushed down, and when the lid is opened, the mirror will pop up.

---

This invention relates to mirror mountings, and more particularly to mountings for mirrors which are adapted to be utilized in luggage cases, particularly those of the train or beauty case type.

In luggage cases of the train or beauty case type, such as of the Axtell U.S. Patent 3,029,915, a mirror has been conventionally mounted in the top of the luggage case, which usually contains a tray for containing small cosmetic items, such a mirror being adapted to be utilized by the user of the case in the application of cosmetics, hair brushing and the like. However, a position inside the top or lid is not always the most suitable position for the use of a mirror, while there often are times when the user wishes to place the mirror on a dressing table or other surface, which requires that the entire case be moved to that position. In addition, the opening of the lid permits the mirror to be placed in only one angular position, and it is often desirable to adjust the mirror to different angular positions.

Among the objects of this invention are to provide a novel mirror mounting; to provide such a mirror mounting which is particularly adapted to be utilized in luggage cases of the train or beauty case type; to provide such a mirror mounting which permits the mirror to be moved to a flat or storage position, when the top of the luggage case is closed, but will cause the mirror automatically to move upwardly to a use position, when the top of the luggage case is opened; to provide such a mounting which permits the mirror to be removed from the case and placed on a supporting surface and in which position the mirror will be adequately supported; to provide such a mirror mounting which permits the mirror to be moved to different angular positions, either while mounted in the case or when removed from the case and placed on a supporting surface; and to provide such a mirror mounting which may be economically manufactured and which is effective and efficient in use.

The foregoing and additional objects, as well as the novel features of this invention will become apparent from the description which follows, taken in conjunction with the accompanying drawings, in which:

FIG. 1 is a perspective view of a mirror mounting in which a mirror is installed in position for use on the rim of a cosmetic tray of a train or beauty type of luggage case;

FIG. 2 is a perspective view, on a slightly reduced scale, of the mirror and mounting of FIG. 1, after removal from the luggage case and placement on a supporting surface;

FIG. 3 is a vertically condensed end elevation of a train or beauty type of luggage case, with the top thereof being in section to show the mirror inside the case in the manner in which it is held in storage position by the closed top of the case, with the position of the top of the case and the mirror and its mounting, when the top is opened, being shown in dotted lines;

FIG. 4 is a vertical section, on an enlarged scale, taken along line 4—4 of FIG. 1;

FIG. 5 is a fragmentary vertical section, on a further enlarged scale, taken along line 5—5 of FIG. 1;

FIG. 6 is a fragmentary vertical section, on essentially the same scale as FIG. 5, taken along line 6—6 of FIG. 2;

FIG. 7 is a three-quarter front, exploded perspective view of the parts of the mirror mounting and mirror of FIG. 1, on a slightly enlarged scale; and FIG. 8 is a rear elevation, on a further enlarged scale, of a front half of a base of the mirror mounting of FIG. 7.

As illustrated in FIGS. 1 and 4, a mirror mounting constructed in accordance with this invention for a mirror 10, such as rectangular in shape, may comprise a frame F in which the mirror 10 is held by a rear cover C and pivotally mounted on a bifurcated base comprising a front half H and a rear half R. The front half H and rear half R of the base are spaced apart below the pivotal connection, so that the mirror mounting may be placed on an upstanding rear rim 11 of a tray 12, supported in a conventional manner in the upper portion of the bottom part 13 of a train or beauty case, as in FIG. 3, which bottom part is normally deeper than the upper portion or top 14. The mirror mounting is constructed so that, when in the position of FIG. 1 on the rear rim of the tray, the frame F will be moved downwardly over the tray, when the lid or top 14 is closed, but will automatically rise up to the dotted position of FIG. 3, when the top 14 is opened to the dotted position shown. The automatic raising of the mirror from a lower position forwardly and perpendicular to its base to the upright position is produced by resilient means, such as described below. Also, the mirror and its mounting may be bodily removed from the rim 11 of the beauty case tray and adjusted rearwardly, then placed on a supporting surface 15 of FIG. 2. In such position, as well as when still remaining within the case, the frame F may be adjusted rearwardly and held in any adjusted position by cooperating friction surfaces, which will also be described later. In the position shown in FIG. 2, the frame F and consequently the mirror 10 have been adjusted rearwardly from the position of FIG. 1 and will stay in that position, as well as other angular positions, both forwardly and rearwardly of that shown. The resilient means mentioned above urges the mirror to the upright position of FIG. 1, actually tipped slightly rearwardly, as in FIGS. 3 and 5, and also causes the frame and mirror to reassume the upright position, whenever the pressure of the case top 14 is released. However, the friction surfaces, described later, hold the mirror in an adjusted position from the upright position to any angular position in which the mirror is disposed rearwardly at an angle of slightly less than 90° to the base. As indicated above, when mounted on the rim 11 of the case tray, as in FIG. 1, the mirror may also be adjusted rearwardly to any desired angular position relative to the base, i.e. between the position of FIG. 1 and the position of FIG. 2.

Each of the frame F, cover C front half H and rear half R of the base are conveniently molded from a suitable plastic, such as polystyrene. The frame F, as shown more clearly in FIG. 7, is an open structure, until closed by the mirror 10, having a bottom flange 17, a top flange 18 and side flanges 19 and 20, connected together and formed integrally with a decorative rim 21 extending around the front edge of the flanges. Bottom flange 17 may be wider than top flange 18, as shown, with the side flanges 19 and 20 tapering in accordance with the width of the bottom and top flanges. The rear side of rim 21 forms a shoulder against which the mirror 10 fits and is held in position by the cover C. As in FIG. 7, the cover C is closed and comprises a panel 24, formed integrally around its edges with a wider bottom flange 25, a narrower top flange 26 and tapering side flanges 27. Angular ribs 28, between the bottom flange 25 and respective side flanges 27, as well as angular ribs 29, between the top flange 26 and the respective side flanges 27, not only reinforce the cover C but also assist in holding the mirror in position, as in FIG. 4. The mirror 10 may merely be placed within the frame F and the cover C then placed in position, after which the frame and cover may be more securely attached together. Thus, a suitable adhesive may be utilized in sealing the respective top, bottom and side flanges of the cover to the corresponding flanges of the frame, or the parts can be ultrasonically welded together after assembly.

For pivot purposes, depending ears 30 and 31 are formed at opposite sides of the frame F, being essentially extensions of the respective side flanges 19 and 20, with each ear being provided with a hole 32 which engages a half or semicircular pin 33 or 34 extending laterally from opposite sides of the front half H of the base, as shown also in FIG. 8, and a complementary half or semicircular pin 35 or 36, extending laterally from opposite sides of the rear half R of the base, as in FIG. 7. As in FIG. 1, the holes 32 and ears 30 and 31 hold the half pins together at each side. Abutting surfaces of the front and rear halves of the base may be cemented together by a suitable adhesive, after assembly to the frame F and particularly after installation of the springs S and S' of FIG. 7, or the front and rear halves of the base may be ultrasonically welded together after assembly.

Each of the springs S and S' is a torsion spring and, as in FIG. 7, is each provided with a short perpendicular end 38 and, opposite thereto, a long perpendicular end 39, with the two ends lying in the same plane when the springs are in the relaxed or unloaded position shown. The bottom flange 25 of the frame F is provided with a pair of slots 40 and 41 and the cover C with corresponding slots 42, so that the longer end 39 of spring S may be received in slot 40 and the longer end 39 of spring S' received in slot 41 of the frame. Thus, in the upright position of FIG. 1, the long ends 39 of both springs will be disposed at slightly over 90° to the short ends 38, but when the mirror and cover C are moved forwardly and down to the full position of FIG. 3, the long ends 39 will be in the same plane as the short ends 38.

The front half H of the base, as in FIGS. 7 and 8, may comprise a semi-cylindrical barrel 44, from the rear edge of which depends a flange 45 whose lower edge 46 is beveled to facilitate placing the base on the rim 11, as in FIG. 1. The barrel 44 is reinforced by a series of ribs, including thicker end ribs 47, from which half pins 33 and 34 extend. End ribs 47 are also respectively provided with a centrally located hole 48 and slot 49, for a purpose described later. A pair of slots 50, which accommodate the movement of the long ends 39 of springs S and S', are spaced inwardly from ribs 47, with ribs 51 and 52 on the inside and outside, respectively, of each slot 50. Each rib 51 is provided with a notch 53, with one notch having a hole 54, into which the short end 38 of spring S extends, and the other notch 53 having a hole 55, into which the short end 39 of spring S' extends. The distance between holes 53 and 54 and the opposite rib 52 each correspond to the length of the springs. A center rib 56 is provided with a notch 57, through which both springs extend and in which the corresponding centers of the springs are received in side by side relation, as in FIG. 4.

The rear half H of the base, as in FIG. 7, is provided with a semi-cylindrical barrel 60, from the lower rear edge of which a flange 61 depends, with the lower edge 62 of flange 61 being beveled, again in order to facilitate placement of the base over rim 11, as in FIG. 1. The spacing between flanges 45 and 61 is preferably sufficient to accommodate rim 11 with a slight frictional fit, so that the base may be readily placed on or removed from the rim 11, but the mirror mounting will remain in a relatively steady position on the rim. When the mirror and its mounting have been placed on a surface 15, as in FIG. 2, the mirror mounting is supported on the surface by barrel 44 and flange 45.

In further accordance with this invention, the radius of barrel 60 of the rear half R of the base is slightly greater than the radius of barrel 44 of the front half, while the lower flange 17 of the frame F is provided with a depending boss 63, having an arcuate surface 64 on the underside, whose radius is greater than the radius of barrel 44 but equal to or slightly less than the radius of barrel 60, as in FIGS. 5 and 6, so that when the frame F is pivoted between the full and dotted positions of FIG. 3, the surface 64 will clear barrel 44, to permit the frame to move freely, except for the action of the springs S and S', and any friction produced is at the pivot pins. However, the outer surface of barrel 60 and the undersurface 64 of boss 63 comprise friction surfaces, which will engage each other, when the frame F is pivoted rearwardly, such as between the position of FIG. 1 and the position of FIG. 2. Thus, as in FIG. 5, there is a clearance between friction surface 64 and barrel 44, but, as in FIG. 6, the friction surface 64 engages the barrel 60, as seen as the frame F has moved rearwardly past center. The friction between the outer surface of barrel 60 and the friction surface 64 should be sufficient to overcome any pressure by springs S and S' which tends to move the frame F and mirror 10 back to the upright position of FIG. 1, but the comparatively large area of these friction surfaces requires a slight contact only to provide sufficient friction to hold the frame F in any adjusted rearward position. Since the ends 38 and 39 of each spring extend in opposite directions when the spring is in the relaxed position of FIG. 7, i.e. the ends 38 and 39 are 180° apart, the force tending to move the frame F back to this 180° position is considerably greater when the springs are twisted by pivoting the ends 39 into the same plane with ends 38, i.e. the full position of frame F of FIG. 3, than when the ends 39 are upright. Thus, the force produced by the springs is sufficient to cause the mirror to spring upright, when the lid of the case is opened. It will be understood that a normal opening rate of the top 14 of the case will permit the kinetic energy of the frame and mirror, produced by the force of the springs, to force the friction surface 64 onto the outer surface of barrel 60, as in FIG. 5, so that the mirror will be tipped slightly rearwardly, as in the dotted position of frame F of FIG. 3. However, such rearwardly tipped position will usually be found to be a convenient position for use of the mirror. Also, if the top of the case is opened quickly, the kinetic energy of the frame and mirror may be sufficient to cause the frame to move further rearwardly, toward the position of FIG. 2. However, the mirror may be readily adjusted forwardly, if that occurs.

The rear half R of the base, as in FIG. 7, is provided with a reinforcing rib 65 at each end, from which ribs half pins 35 and 36 extend laterally and smaller pins 66, centrally located, extend forwardly. One pin 66 fits into hole 48 in the opposing end rib 47 of the front half H of the base, as in FIG. 6, while the opposite pin 66 extends into slot 49, thereby accommodating molding tolerances but insuring that the two halves of the base will be in longitudinal alignment. Barrel 60 is also provided with a pair of slots 67 which accommodate movement of the long ends 39 of the springs and which are placed opposite slots 50 in barrel 44 of front half H. Each slot 67 is flanked by a pair of reinforcing ribs, including a rib 68 on the inside and a rib 69 on the outside, respectively, each rib 68 being provided with a tongue 70 which, as in FIG. 5, fits into the notch 53 in the opposite rib 51 of the front half, but with clearance for the springs, in order to hold the corresponding end 38 of a spring in the hole 54 or 55 respectively, of FIG. 8. Each spring extends from its end 38 in a hole 54 or 55, alongside the opposite spring, to the opposite slots 50 and 67. Thus, the end 39 of each spring is outside the interfitting ribs 51 and 68, so that such end 39 can therefore move freely within the slots 50 and 67. In addition, the opposed ribs 51 and 69 preferably abut against each other to form a solid partition, particularly when attached together by adhesive or welding, thereby restraining endwise movement of the corresponding spring end 39, to further insure that the spring ends 38 will remain in the holes 54 and 55.

The rear half R is further provided with a center reinforcing rib 71 having a tongue 72 which is adapted to fit into groove 57 of the opposed center rib 56 of the front half H, as in FIG. 4, and provide clearance for the springs but hold the center of each spring in position. As will be evident, the configuration of the interfitting ribs may be varied somewhat, such as shown in FIG. 4, the principal purpose of the interfitting tongues and notches of the opposed ribs described above being to hold the springs in position and permit the springs to be twisted without endwise or longitudinal displacement. Also, the ribs 52 and 69 flanking the respective slots 50 and 67 on the outside may merely abut each other, as shown, or may have an interfitting tongue and notch relationship, in which instance the interfitting tongue should completely or nearly fill the notch.

As will be evident, each of the parts of the mirror mounting of this invention may be formed by injection molding, or in any other suitable manner, from a suitable material, such as polystyrene or other type of plastic. As will be evident, the parts could be formed of a lightweight metal, as by die casting. Thus, the parts may be manufactured in large quantities on a production basis at a comparatively low cost. As indicated previously, the parts may be attached together, subsequent to assembly, by a suitable adhesive, by ultrasonic welding, or in any other suitable manner. For assembly purposes, the parts may be placed in a jig, adapted to hold the base halves together with the springs inside and only the ends 39 extending from the base but held slightly forwardly of the upright position of FIG. 5, so that frame F may be placed over the base with slots 40 and 41 over the spring ends and ears 30 and 31 then snapped onto the pivot pins 33, 35 and 34, 36. As soon as the frame ears have been snapped over the pivot pins, the mirror 10 and cover C may be placed in position, after which the parts may be welded together sonically. If adhesive is used to attach the parts together, the adhesive is preferably applied to the surfaces of the base halves which will abut, just prior to assembly and, similarly, adhesive applied to the inside of the flanges of frame F and to the outside of the flanges of cover C just prior to assembly of these parts together.

From the foregoing, it will be evident that the requirements and objects hereinbefore set forth have been fulfilled to a marked degree. A mirror mounting has been provided which permits the mirror to be placed on or removed from a rim of the tray of a train or beauty type of luggage case, or on any other desired flange or rim, and adjusted to various positions, with the case open. When removed from the case, the mirror frame may be pivoted to a position such that the base will readily support the mirror in any adjusted rearward position, such as that shown in FIG. 2. Furthermore, the springs S and S', or any equivalent resilient means, cause the mirror to automatically move to an upright position whenever the lid of the case is opened, as well as permit the mirror to be pushed down by the lid to storage position, when the lid of the case is closed.

Although this invention has been illustrated and described in preferred embodiment, it will be understood that other embodiments may exist and that various changes may be made, all without departing from the spirit and scope of this invention.

What is claimed is:
1. A mirror mounting comprising:
   a frame receiving said mirror;
   a base for said frame, said frame being attached to said base for pivotal movement relative thereto;
   resilient means engaging said frame and said base for urging said frame toward a predetermined position; and
   said base being longitudinally hollow and said resilient means extending longitudinally in said hollow base with a portion thereof extending to said frame.
2. A mirror mounting, as defined in claim 1, wherein:
   said base is provided with lateral slots for the portion of said resilient means extending to said frame.
3. A mirror mounting, as defined in claim 2, wherein:
   said longitudinally hollow base is formed by opposed parts having segments hollow on the inside.
4. A mirror mounting, as defined in claim 3, wherein:
   said opposed parts of said base are provided with depending, longitudinal flanges disposed in spaced relation.
5. A mirror mounting, as defined in claim 3, wherein:
   said opposed parts are provided with transverse ribs in opposed positions and forming restraining spaces for said resilient means; and
   said resilient means includes a torsion spring having one end held at one rib and the other end extending through a transverse slot in said base to said frame, with a spaced rib forming a barrier to longitudinal movement of said other end of said spring.
6. A mirror mounting, as defined in claim 1, constructed and arranged to be mounted in a generally upright position on a rim of a part in the upper portion of a luggage case or the like having a lid and wherein:
   said resilient means permits said frame and mirror to be pivoted downwardly by said lid when said lid is closed; and
   said resilient means moves said frame and mirror to at least said upright position when said lid is opened.
7. A mirror mounting comprising:
   a frame receiving said mirror;
   a base for said frame including opposed, generally semi-cylindrical segments, with one segment having a greater diameter than the other segment;
   resilient means engaging said frame and said base for urging said frame toward a predetermined position;
   said frame being pivoted at opposite ends of said base segments for pivotal movement relative to said frame; and
   said frame being provided with an arcuate surface clearing the segment of smaller diameter and frictionally engaging the surface of the segment of greater diameter, thereby opposing movement of said frame by said resilient means over a portion of the total movement of said frame relative to said base.
8. A mirror mounting, as defined in claim 7, wherein:
   said resilient means comprises a pair of elongated torsion springs formed of wire-like material and each having a longer end and a shorter end, with each end being transverse to the remainder of the respective spring;
   said segments are hollow on the inside and are provided with semicircular, transverse end ribs from which abutting semi-cylindrical pins extend in opposite directions, opposed transverse slots spaced inwardly from each end rib, a pair of opposed ribs flanking each slot and opposed center ribs having an interfitting configuration providing a space through which said spring extends, the rib on the inside of each slot of one segment being provided with a notch and a hole in said notch for receiving the shorter end of one spring and the opposed rib of the opposite segment having a tongue extending into said notch to hold said shorter end of said spring in said hole, the longer end of each spring being movable through the opposed slots adjacent the opposite end of said segments and the opposed ribs outside said slot restraining said longer end of the respective spring against outward longitudinal movement; and said frame having top, bottom and side flanges and adapted to receive said mirror, said frame being provided with a depending ear at each end having a circular hole for receiving the abutting semi-cylindrical pins extending laterally from each end of said base segments, said lower flange having spaced slots through which the longer end of the corresponding spring extends and a depending boss provided on the underside with said arcuate friction surface.

9. A mirror mounting, as defined in claim 8, wherein: a cover fits within said frame flanges and holds said mirror in said frame, said frame and cover being adhered together and said opposed segments of said base being adhered together; and each segment of said base has a longitudinally extending, depending flange opposite said frame, said flanges being spaced apart and provided with a beveled lower edge.

References Cited
UNITED STATES PATENTS

| | | | |
|---|---|---|---|
| 1,485,915 | 3/1924 | Hammel | 248—479 XR |
| 2,261,301 | 11/1941 | Smith | 248—486 XR |
| 2,807,515 | 9/1957 | Dean | 248—479 XR |
| 2,960,007 | 11/1960 | Burtchaell. | |

ROY D. FRAZIER, *Primary Examiner.*

J. FRANKLIN FOSS, *Assistant Examiner.*